Aug. 26, 1947.  A. J. PENICK  2,426,370
PIPE SEAL
Filed Dec. 4, 1943  3 Sheets-Sheet 2

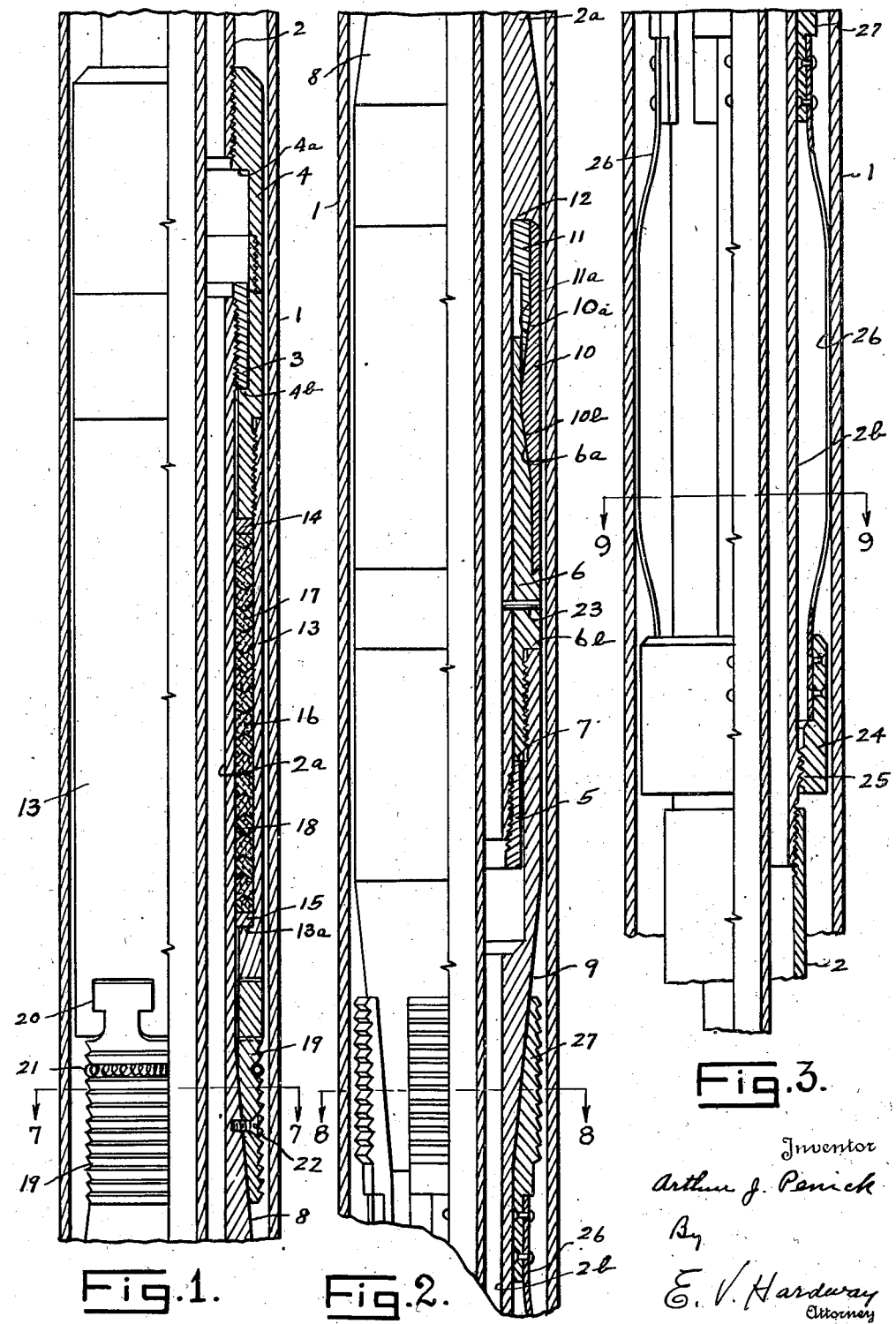

Inventor
Arthur J. Penick
By
E. V. Hardway
Attorney

Aug. 26, 1947.　　　A. J. PENICK　　　2,426,370
PIPE SEAL
Filed Dec. 4, 1943　　　3 Sheets-Sheet 3

Inventor
Arthur J. Penick
By E. V. Hardway
Attorney

Patented Aug. 26, 1947

2,426,370

UNITED STATES PATENT OFFICE 2,426,370

PIPE SEAL

Arthur J. Penick, Houston, Tex., assignor to Oil Center Tool Company, Houston, Tex., a corporation of Texas Application December 4, 1943, Serial No. 512,949

2 Claims. (Cl. 166—12)

This invention relates to a pipe seal.

An object of the invention is to provide means for forming a fluid tight seal between an outer pipe and an inner pipe and has been specially designed for use in forming a seal between such pipes in a well although it is capable of general use for forming a seal between an outer and an inner pipe.

A further object of the invention is to provide means for securely maintaining the seal in expanded, or active, position.

A further object of the invention is to provide, also, means for releasing the seal so that it may contract so as to permit the withdrawal of the inner pipe and seal from the outer pipe.

With the above and other objects in view, the invention has particular relation to certain novel features of construction, arrangement of parts and use, an example of which is given in this specification and illustrated in the accompanying drawings wherein—

Figures 1, 2 and 3 show side views of upper, intermediate and lower sections, respectively, of the assembly partly in section and showing the seal collapsed.

Figures 4, 5, 6:
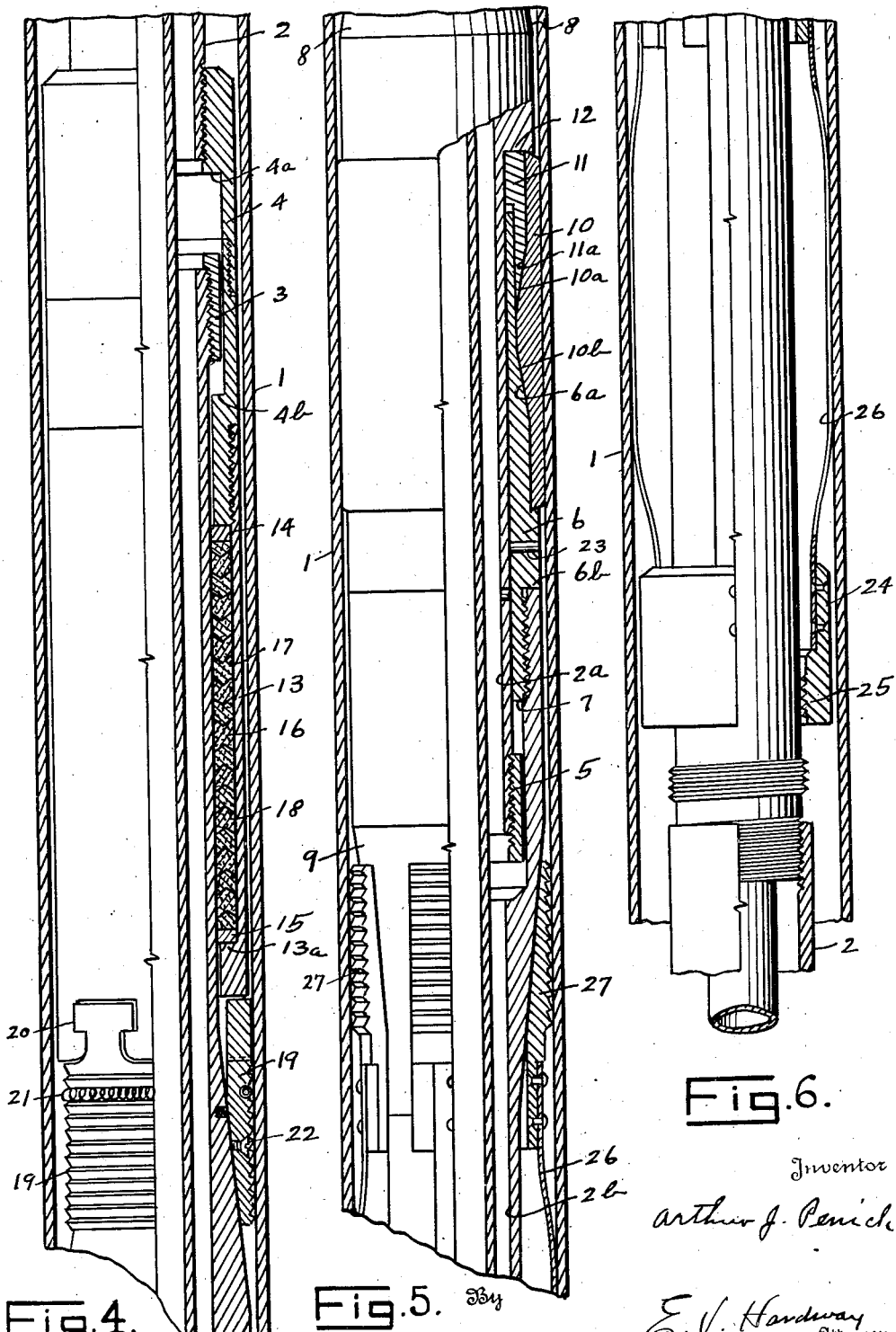
Figures 4, 5 and 6 show, respectively, annular views showing the seal expanded, or in active position.

Referring now more particularly to the drawings wherein like numerals of references designate similar parts in each of the figures, the numeral 1 designates an outer pipe or casing set in a well bore, and the numeral 2 designates an inner pipe. These pipes extend to the ground surface and the inner pipe has, incorporated therein, special upper and lower sections 2a and 2b. The section 2a has an external collar 3 screwed unto its upper end which fits within the coupling 4 which is screwed onto the lower end of the inner pipe section above. This special coupling has the inside annular upper and lower shoulders 4a and 4b which limit the movement of the coupling 4 on the special section 2a.

The lower end of the section 2a telescopes into the upper end of the section 2b beneath and has an external collar 5 screwed thereon.

Surrounding the lower end of the section 2a there is a sleeve like expander 6 whose lower end is screwed into the upper end of expander 9 and whose inner diameter is somewhat less than the external diameter of the collar 5 thus forming an inside annular shoulder 7 against which said collar may engage when the section 2a is moved upwardly relative to the section 2b.

Figure 10:
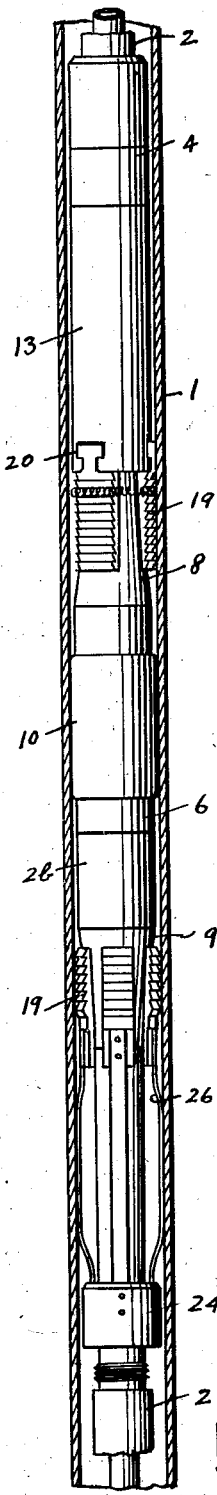
Figure 10 shows a side elevation of the complete assembly with the seal expanded.
Figure 7:
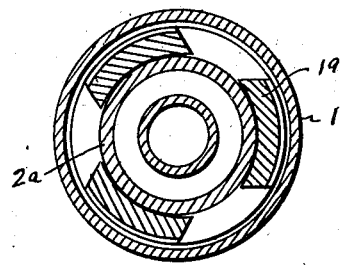
Figure 7 shows a cross sectional view taken on the line 7—7 of Figure 1.
Figure 8:
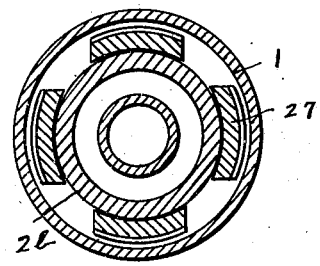
Figure 8 shows a cross sectional view taken on the line 8—8 of Figure 2.
Figure 9:
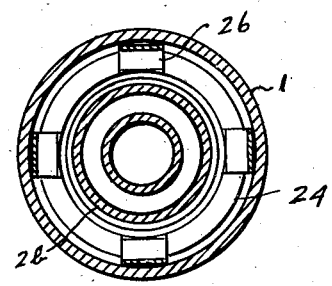
Figure 9 shows a cross sectional view taken on the line 9—9 of Figure 3.

As will be noted from an inspection of Figures 2, 5 and 10, the section 2a has a downwardly flared intermediate portion forming an upper slip expander 8 and the section 2b has an upwardly tapering portion forming a lower slip expander 9. Said sections are accordingly outwardly thickened to form these slip expanders. The sleeve-like expander 6 is also outwardly thickened forming a external annular shoulder 6b which abuts the opposing end of the lower section 2b as shown in Figures 2 and 5.

There is a surrounding sleeve 10 formed of lead or other deformable material. This sleeve has its upper and lower ends, respectively, dovetailed into the outwardly thickened portions, respectively, of the upper expander 8 and of the expander sleeve 6 as clearly shown in Figures 2 and 5. The sleeve 10 is inwardly thickened between its ends and thus formed with the inwardly converging upper and lower tapering faces 10a and 10b.

The upper end of the expander 6 is reduced in external diameter and is formed with a taper, or expanding portion, 6a which conforms to the taper of and fits against the face 10b.

Within the upper end of the sleeve 10 and closely surrounding the section 2a there is a sleeve like wedge 11 whose upper end abuts the external shoulder 12 of the upper expander 8. The lower end of this wedge 11 telescopes over the upper end of the expander 6 and its lower end is externally tapered downwardly forming the downwardly converging face 11a which conforms in shape to and fits against the inside tapering face 10a of the sleeve 10.

Around the section 2a above the expander 8 there is a tubular packing retainer 13 whose upper end is screwed unto the lower end of the coupling 4 and whose lower end is inwardly thickened forming the inside, annular, upwardly facing shoulder 13a. Within the packing retainer there are the upper and lower metal rings 14, 15 and the intermediate ring 16 with suitable upper and lower series of packing rings 17, 18 between said metal rings. The upper ring 14 abuts the lower end of the coupling 4 while the lower ring 15 rests on the shoulder 13a. A fluid tight seal is thus formed around the section 2a.

A series of wedge shaped slips 19 are loosely connected to the lower end of the packing retainer 13 by means of dovetailed connections 20. These slips are maintained assembled by an elastic band 21 there around, preferably a coil spring. Their inner sides are tapered to conform to the taper of, and to fit against, the expander 8 and their outer sides are toothed. They are initially pinned to said expander, in inactive position, by the frangible pin 22 and initially the expander 6 is pinned to the section 2a by the frangible pin 23, with the sealing slip 10 contracted or in collapsed position all as shown in Figures 1 and 2.

Beneath the lower expander 9 there is a collar-like anchor 24 which is screwed onto the lower section 2b by means of right hand threads 25.

There are the outwardly bowed flexible springs 26 whose lower ends are fastened to the anchor 24. Attached to the upper ends of the springs 26 are the slips 27 whose inner sides are tapered to conform to the taper of, and to fit against, the expander 9 and whose outer surfaces are toothed to engage the well casing 1.

The outwardly bowed springs 26 are in frictional engagement with the outer pipe or casing 1.

The assembly is shown in Figures 1, 2 and 3 in position to be lowered into the well casing 1 with the slips 19 pinned to the section 2a by the frangible 22 and with the expander 6 pinned to said section by the frangible pin 23 and with the anchor 24 screwed onto the lower end of the section 2b. When the desired location has been reached to expand the sealing sleeve 10 to form the seal between the outer and inner pipes the inner string of pipe 2 may be rotated to unscrew the threads 25. The outwardly bowed springs 26 will hold the anchor 24 stationary to permit this. Thereupon when the inner pipe is further lowered the expander 9 will expand the slips 27 into engagement with the casing 1 and the lower section 2b together with the expander 6 will be held against further downward movement and the weight of the string of pipe above will thereupon shear the pin 23 and the section 2a will move downwardly forcing the wedge 11 downwardly and causing the faces 10a, 11a and 10b, 6a to coact and the endwise compressive force exerted on the sleeve 10 as well as the coaction of said faces will cause the deformable sleeve 10 to be expanded to form a fluid tight seal with the outer pipe or casing 1 and the frangible pin 22 will be sheared to allow the slips 29 to move downwardly and outwardly into engaging relation with the pipe 1 so as to hold said sleeve expanded, all as shown in Figures 4, 5 and 6.

The seal may be broken and the inner pipe removed if desired. This may be accomplished by an upward pull on the inner pipe 2 whereupon the shoulder 4b will engage the lower end of the collar 3 and at the same time the slips 19 will be pulled upwardly and released from the outer pipe. Upon further upward movement of the inner pipe 2 the collar 5 will engage the lower end 7 of the expander 6 and the expander 9 will be withdrawn from, and will release the slips 27. The sleeve 10 and wedge 11 will be relieved from the endwise compressive force allowing said sleeve 10 to contract and it will be released from the casing 1 and the complete assembly may then be withdrawn from the well.

What I claim:

1. Sealing means for forming a fluid tight seal between an outer pipe and an inner pipe in a well bore comprising two tubular sections one telescoping into the other and said sections being movable axially relative to each other, shoulders on the sections arranged to interengage to prevent complete separation of the sections, a sleeve of deformable material around the telescoping portions of said sections, external shoulders on said sections which abut the ends of said sleeve, said sleeve being inwardly thickened between its ends and formed with upper and lower annular inwardly tapering, faces, the outer tubular section having an external tapering portion which fits within one of said tapering faces, a sleeve like wedge around the inner section and having an end which telescopes over the opposing end of the outer section and is externally tapered inwardly and fits within the other of said faces, an external shoulder on said inner section which abuts the other end of said wedge whereby upon longitudinal movement of the inner section relative to the outer section, in one direction, said tapering portion and said wedge will operate against the internal faces of the sleeve to expand the sleeve.

2. Sealing means for forming fluid tight seal between an outer pipe and an inner pipe in a well bore comprising two tubular sections one telescoping into the other and said sections being movable axially relative to each other, shoulders on the sections arranged to interengage to prevent complete separation of the sections, a sleeve of deformable material around the telescoping portions of said sections, external shoulders on said sections which abut the ends of said sleeve, said sleeve being inwardly thickened between its ends and formed with upper and lower annular inwardly tapering faces, the outer tubular section having an external tapering portion which fits within one of said tapering faces, a sleeve like wedge around the inner section and having an end which telescopes over the opposing end of the outer section and is externally tapered inwardly and fits within the other of said faces, an external shoulder on said inner section which abuts the other end of said wedge whereby upon longitudinal movement of the inner section relative to the outer section, in one direction, said tapering portion and said wedge will operate against the internal faces of the sleeve to expand the sleeve, and upon longitudinal movement of said sections relative to each other, in the other direction, said tapering portion and said wedge will be relieved from the internal faces of the sleeve to allow the sleeve to contract.

ARTHUR J. PENICK.

REFERENCES CITED

The following references are of record in the file of this patent:

UNITED STATES PATENTS

| Number | Name | Date |
|---|---|---|
| 823,760 | Callanan | June 19, 1906 |
| 1,804,619 | Humason | May 12, 1931 |
| 1,246,957 | Lindsay | Nov. 20, 1917 |
| 1,919,853 | Mock | July 25, 1933 |
| 2,155,380 | Bean | Apr. 25, 1939 |
| 2,352,423 | Church | June 27, 1944 |